Nov. 2, 1948.  K. M. BARTLETT ET AL  2,452,628
METHOD OF MAKING HOLLOW POPPET VALVES
Filed Aug. 25, 1944  2 Sheets-Sheet 2
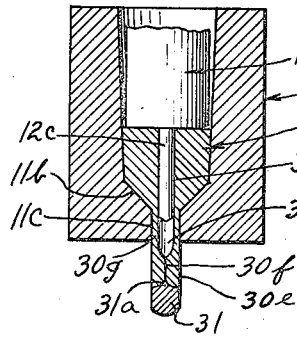
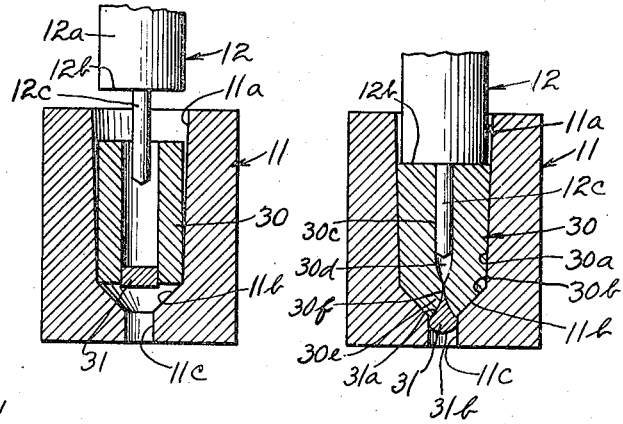
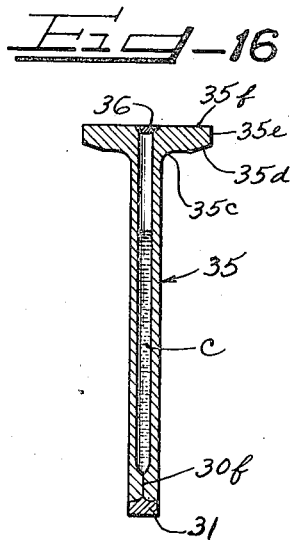
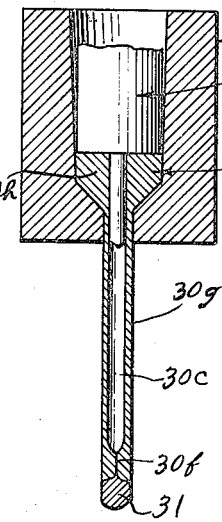
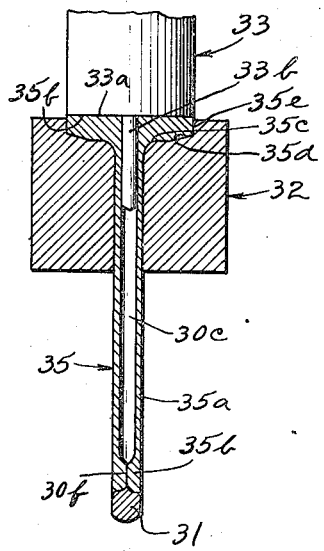
INVENTORS
Kenneth M. Bartlett
Edward G. Pekarek
By Charles W. Hills Attys Patented Nov. 2, 1948

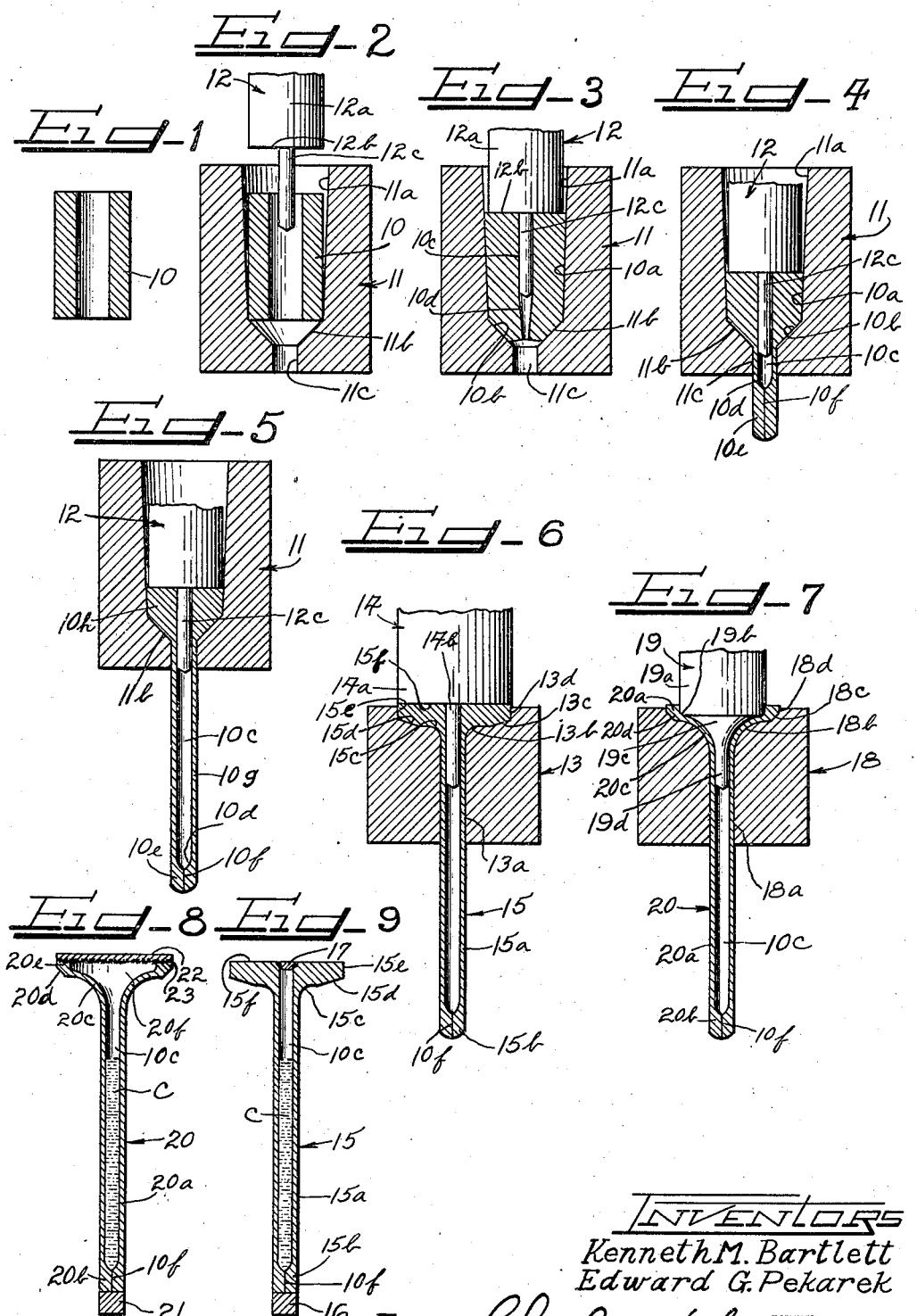

2,452,628

UNITED STATES PATENT OFFICE 2,452,628

METHOD OF MAKING HOLLOW POPPET VALVES

Kenneth M. Bartlett and Edward G. Pekarek, Cleveland, Ohio, assignors to Thompson Products, Inc., Cleveland, Ohio, a corporation of Ohio Application August 25, 1944, Serial No. 551,179

2 Claims. (Cl. 29—156.7)

This invention relates to methods of manufacturing hollow poppet valves from heavy-walled seamless tubing.

Specifically, the invention deals with the production of hollow stem or hollow head and stem poppet valves for internal combustion engines from metal tubing by simple extruding and coining operations.

According to this invention, seamless tubing, cut to proper length increments, is heated to forging temperatures and the cut length is dropped into an extrusion die coacting with a punch equipped with a projecting mandrel or pin. The pin fits freely in the tubing length, and the end face of the punch forces the tube through the extruding throat of the die thereby collapsing the tube around the mandrel or pin and extruding the thick wall of the tube into hollow valve stem diameter. The mandrel does not project completely through the tube length, so that the initial extruding operation collapses the leading end of the tube length for closing this end. A pipe is formed through the center of the closed end of the tube. This pipe is later covered by a welded-on tip, in one embodiment of the invention.

The mandrel or pin projects forwardly from the active face of the punch a sufficient distance so that it enters the throat of the extrusion die immediately above the closed end of the tube for preventing complete collapse of the tube above the closed end to thereby maintain a hole in the tube. The extrusion operation is terminated before the entire tube is forced through the extrusion throat, so that the resulting extruded tube has a long, hollow portion closed at one end thereof and terminating in an enlarged head or nubbin at the other end thereof. The head or nubbin is coined into valve head shape and size, and a pin or mandrel on the coining punch maintains the hole from the stem cavity through the coined head. If desired, the coining punch can have an expanding portion to form a hollow head.

The hollow stem but solid head valve has the hole through the valve head thereof closed with a welded-in plug, while the hollow stem, hollow head valve has the open hollow head cavity covered with a welded-on disk.

The pipe through the closed end of the stem is covered with a welded-on tip.

In another embodiment of the invention, the tube length is initially closed at one end thereof with a welded-in plug prior to the extruding operation. This plug covers the pipe in the closed end of the resulting valve stem to form a tip on the valve stem.

It is, then, an object of this invention to form hollow poppet valves from seamless tubing by simple extruding and coining operations.

A still further object of the invention is to produce hollow poppet valves for internal combustion engines from thick-walled seamless tubing.

Another object of the invention is to produce hollow poppet valves from seamless tubing by simultaneously extruding a tube blank through an extrusion die while completely closing one end of the tube length and while preventing complete collapse of the other end of the tube length with an inserted mandrel.

A still further object of the invention is to completely close one end of a seamless tube by an extruding operation while supporting the major portion of the length of the tube on a mandrel during a continued extruding operation to produce a valve stem having a closed tip end and a hollow cavity extending from said tip end.

A still further object of the invention is to provide a method of making hollow poppet valves from seamless tubing involving the formation of a tip end on the valve stem by extruding operations from a plug inserted in an end of the tube prior to the extruding operation.

Other and further objects of the invention will be apparent to those skilled in the art from the following detailed description of the annexed sheets of drawings which, by way of preferred examples only, illustrate several embodiments of the invention.

On the drawings:

Figure 1 is a longitudinal cross-sectional view of a length of thick-walled seamless tubing from which the valves of this invention are made.

Figure 2 is a vertical cross-sectional view, with a fragmentary part shown in side elevation, of an extrusion die and punch assembly containing the tube length of Figure 1 and illustrating the arrangement and positions of the parts at the start of the extruding operation.

Figure 3 is a view similar to Figure 2 but illustrating the partially collapsed condition of the tube during the first part of the extruding operation.

Figure 4 is a view similar to Figure 3 but illustrating a more advanced stage of the extruding operation.

Figure 5 is a view similar to Figure 4 but illustrating the shape and arrangement of the parts at the completion of the extruding operation.

Figure 6 is a vertical cross-sectional view, with a fragmentary part in side elevation, illustrating the valve body formed from the extruded body of Figure 5 in a coining die and punch assembly arranged to form a solid head on the extruded blank.

Figure 7 is a view similar to Figure 6 but illustrating the formation of a hollow head on the valve body.

Figure 8 is a vertical cross-sectional view of a hollow stem, hollow head valve produced from the body of Figure 7.

Figure 9 is a vertical cross-sectional view of a hollow stem, solid head valve produced from the valve body of Figure 6.

Figure 10 is a longitudinal cross-sectional view of a length of seamless tubing having a plug welded into one end thereof to provide the starting blank for a modified process according to this invention.

Figure 11 is a view similar to Figure 2 with the blank of Figure 10 inserted in the die.

Figure 12 is a view similar to Figure 3 but illustrating the blank of Figure 10.

Figure 13 is a view similar to Figure 4 but illustrating the blank of Figure 10.

Figure 14 is a view similar to Figure 5 but illustrating the blank of Figure 10.

Figure 15 is a view similar to Figure 6 but illustrating a valve body produced from the blank of Figure 10.

Figure 16 is a vertical cross-sectional view of a hollow stem, solid head poppet valve produced from the blank of Figure 10.

As shown on the drawings:

In Figure 1 the reference numeral 10 designates generally a length of thick-walled seamless tubing formed of any desired valve metal that can be extruded. The blank 10 is heated to forging temperatures and dropped into an extrusion die 11 having a slightly tapered receiving cavity 11a, the side walls of which converge slightly toward an extrusion throat 11b which discharges through a cylindrical hole 11c. A ram or punch 12 has a cylindrical side wall 12a adapted to fit freely into the die recess 11a. The punch has an active flat face or leading end 12b for acting on the top of the tube 10. A mandrel or pin 12c projects from the center of the face 12b and is of a predetermined length so that it will not project completely through the tube 10 when the end face 12b of the punch is forcing the tube through the extrusion throat, as best shown in Figure 3.

In Figure 3, the active face 12b of the punch 12 has engaged the top of the tube and has forced the tube into tapered conformity with the die wall 11a to provide a tapered side wall 10a on the tube, and to provide a more sharply converging leading end 10b on the tube conforming with the shape of the extrusion throat 11b of the die. This extruding operation on the tube collapses the original bore of the tube which freely receives the mandrel 12c into tight conformity around the mandrel 12c thereby forming a cylindrical hole 10c of much smaller diameter than the original inside diameter of the tube. The mandrel 12c terminates above the bottom end of the tube, and the interior of the tube collapses along a tapered path 10d in advance of the mandrel 12c.

As shown in Figure 4, the extruding operation has continued to a point where a portion 10e of the tube has passed through the discharge hole 10c and has a much smaller diameter than the original tube. The tapered hole portion 10d has collapsed to a pipe 10f producing a solid tip end for the valve stem. The leading end of the mandrel 12c has reached the level of the discharge end of the extrusion throat 11b and maintains the cylindrical hole 10c in the extruding blank. The metal moves away from the leading end of the mandrel but is not extruded beyond the leading end, since the discharge hole 10c is cylindrical and does not further subject the metal to radial pressure.

The metal is further extruded between the mandrel 12c and the extrusion throat 11b as shown in Figure 5 to form an elongated hollow stem 10g with the cylindrical cavity 10c along the length thereof converging inwardly as at 10d to the closed pipe 10f at the solid end 10e of the stem.

The extruding operation is terminated before the tube is forced completely through the extruding throat so that a head portion 10h remains on the upper end of the tube.

The extruded tube of Figure 5 is then placed in a coining die 13 of Figure 6. This coining die has a cylindrical hole 13a therethrough which flares outwardly at the upper end thereof as at 13b to provide a valve head recess. This valve head recess has a flat bevel portion 13c on the outer end of the outwardly flaring portion 13b terminating in a straight upstanding cylindrical wall 13d.

A coining punch 14 has a flat active leading end face 14a from which a cylindrical pin 14b extends. This pin 14b is of the same diameter as the mandrel 12c and fits into the hole 10c of the extruded tube.

The punch 14 presses the head 10h of the tube shown in Figure 5 into the head-forming cavity of the coining die 13 and a poppet valve body member 15 is thereby produced. This body member 15 has a hollow cylindrical stem 15a closed at the bottom 15b thereof but still having the pipe 10f therethrough. The stem 15a extends to an outwardly flaring valve neck 15c which merges into a tapered valve seat face 15d and an upstanding cylindrical peripheral wall 15e together with a flat top wall 15f.

The valve body 15, as shown in Figure 9, has the rounded end wall of the closed end 15b thereof cut off and a tip 16 of hard, wearable material is welded onto the cut-off end to seal the pipe 10f. The hollow stem 15a is partially filled with coolant C such as sodium. It will be noted that the stem cavity extends completely through the valve head and is closed by means of a welded-in plug 17. The plug 17 fits into the hole 10c and is preferably welded into the mouth of the hole at the head of the valve by electrical current which does not heat the metal except locally at the welding area thereof.

As shown in Figure 7, the extruded tube member from Figure 5 can be placed in a coining die 18 similar to the die 13 but having the cylindrical hole 18a thereof flaring outwardly along a convex path 18b to an inclined beveled peripheral wall 18c terminating in an upstanding cylindrical rim wall 18d. The coining punch 19 has a cylindrical wall 19a of smaller diameter than the wall 18d of the die together with a beveled shoulder 19b and a concave tapered portion 19c converging to a cylindrical pin 19d of the same diameter as the hole diameter 10c of the blank.

The die 18 and punch 19 compress the headed end 10h of the blank into a hollow valve head form thereby producing a hollow stem hollow head valve body 20. The body 20 has a cylindrical hollow stem 20a formed from the hollow stem part 10h of the blank and closed at one end 20b thereof except for the pipe 10f therethrough. The stem 20a flares outwardly at the upper end thereof to provide a valve neck 20c which is formed between the die wall 18b and the punch wall 19c. The neck 20c terminates in an upwardly inclined seating face 20d formed between the punch shoulder 19b and the bevel face 18c. An upstanding peripheral rim wall 20e is formed between the cylindrical wall 18d of the die and the cylindrical wall 19a of the punch.

A finished valve 20 is made from the blank of Figure 7 as illustrated in Figure 8 by closing the pipe 10f with a tip 21 welded to the closed end 20b of the stem 20a.

As shown in Figure 8, the stem cavity 10c is partially filled with coolant C such as sodium. The head of the valve has an enlarged cavity 20f merging with the stem cavity 10c. A flat metal disk 22 is welded on the upstanding rim 20e of the valve head around a weld line 23 produced preferably by projection welding.

From the above descriptions of Figures 1 to 9 it will be understood that either a hollow head and hollow stem poppet valve, or a hollow stem and solid head poppet valve, can be formed by simple extruding and coining operations from a seamless tube length which is initially open at both ends and then has one end collapsed to produce a closed pipe sealed with a welded-on tip.

In the embodiment of the invention illustrated in Figures 10 to 16, the welded-on tip is formed from a plug welded into the initial tube length.

As shown in Figure 10, a length of thick-walled seamless tubing 30 receives, in one end thereof, a plug 31 composed of metal suitable for the tip ends of valve stems. This plug 31 is inserted into the interior of the tube 30 for most of its length, and is welded along its inserted length 31a to the inside of the tube. A pilot or shoulder portion 31b of the plug projects from the end of the tube.

As shown in Figure 11, the tube 30 with the welded-in plug 31 is inserted into the same die 11 and acted on by the same punch 12 described above in connection with Figure 2. The tube 30, at the start of the welding operation, rests on the converging wall 11b of the punch 11.

As shown in Figure 12, the active face 12b of the punch 12 has forced the tube 30 into the extrusion die so that the tapered die wall 11a has collapsed the tube into conformity therewith providing a tapered wall 30a thereon, while the tapered wall 11b of the die has formed a tapered portion 30b. The inside of the tube has been collapsed around the mandrel 11c to provide a cylindrical hole 30c of much smaller diameter than the original inside diameter of the tube. The portion of the tube in advance of the mandrel 30c has been collapsed as at 30d to a closed end 30e with a pipe 30f therein. The plug 31 has the portion 31a projecting into the tube squeezed into a necked-down portion sealing the pipe 30f. The projecting portion 31b of the plug is somewhat elongated to form a rounded leading end on the assembly entering the discharge hole 11c of the extrusion die.

As shown in Figure 13, the extrusion operation is continued to force through a solid end 30e with a pipe 30f therethrough covered by the plug 31 and followed by a hollow stem portion 30g which is formed between the mandrel 12c and the extrusion throat 11b.

The extrusion operation is continued as described in connection with Figure 5 to produce the extruded blank of Figure 14 which has the hollow stem portion 30g and the head portion 30h with the stem cavity 30c extending through the head portion 30h.

The blank of Figure 14 is coined as shown in Figure 15 in the die 32 as described in connection with Figure 6, and a plunger 33 has a flat active leading face 33a with a projecting central mandrel or pin 33b for maintaining the hole 30c of the blank. A valve body 35 is thus produced. This valve body has a hollow stem 35a with a closed tip end 35b having the pipe 30f therethrough sealed by the welded-in plug 31. The valve body 35 has an outwardly flaring neck 35c, a beveled seating face 35d, an upstanding cylindrical peripheral wall 35e and a flat top face 35f.

A finished valve is produced from the body 35 as shown in Figure 16 by filling the stem cavity with coolant C such as sodium, by grinding off the plug 31 to provide a flat end thereon, and by welding a plug 36 into the upper end of the stem cavity in the head of the valve.

Obviously, of course, the coining operation of Figure 7 could be used in place of the operation shown in Figure 15 to produce a hollow stem and hollow head valve.

The modification of the process as illustrated in Figures 10 to 16 therefore provides a valve with a shaped tip end closing the pipe through the closed end of the valve stem.

The processes herein illustrated and specifically described are only two embodiments of processes according to this invention for producing a hollow poppet valve from seamless tubing by simple coining and extrusion methods.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of making bodies for hollow poppet valves from thick-walled seamless tubing having an outside diameter less than the diameter desired for the finished valve head and an inside diameter greater than the desired diameter for stem cavity of the finished valve stem which comprises inserting a relatively short length of said tubing into a tapered die having a tapered extrusion throat converging to a circular hole of valve stem diameter, inserting a short mandrel into said tube to terminate intermediate the ends of the tube, centering the mandrel in the tube in spaced relation from the interior tube wall, pressing an end face of the tube without deforming the contour of said end face to force the opposite end through said extrusion throat and to collapse the tube into conformity with the tapered die wall, simultaneously collapsing said opposite end of the tube in advance of the mandrel to form a solid leading end on the tube, extruding a portion of the collapsed tube through said hole to form a solid valve stem end portion, aligning the leading end of the mandrel in the central portion of said circular hole, continuing the extruding operation around said mandrel to form a hollow valve stem of desired length, terminating the extruding operation before the pressed end portion of the tube has been forced through the extrusion throat to leave a head of appreciable mass on the tube and having a neck portion conforming to the shape of the extrusion throat, removing the mandrel from the resulting blank, removing the blank from the die, seating the head of the blank in a coining die having a die cavity of desired valve head and neck contour, inserting another mandrel into the head end of the blank, and coining the head end of the blank around said second mandrel to increase the diameter of the head of the blank and to form the head into the desired valve head shape without deforming the original contour of the end face of the tube.

2. The method of making a hollow poppet valve from tubing which comprises inserting a metal plug partially into one open end of an open-ended thick-walled metal tube, securing the plug to the tube with a portion of the plug of less diameter than the outside diameter of the tube projecting from the tube end, inserting a mandrel into the other end of the tube to a depth terminating in spaced relation from the plug, extruding the plugged end of the tube to first form a rounded leading valve stem tip end of plug material from the projecting portion of the plug, continuing the extrusion in advance of the mandrel to form a solid valve stem end composed of a piped collapsed tube portion having the pipe sealed by the plug, further continuing the extrusion around the mandrel to form a hollow valve stem, terminating the extrusion in advance of the trailing open end of the tube, and coining the open trailing end of the tube into valve head shape and size.

KENNETH M. BARTLETT.
EDWARD G. PEKAREK.

REFERENCES CITED

The following references are of record in the file of this patent:

UNITED STATES PATENTS

| Number | Name | Date |
| --- | --- | --- |
| 1,294,416 | Dady | Feb. 18, 1919 |
| 1,683,077 | Joyce | Sept. 4, 1928 |
| 1,702,310 | Oakley | Feb. 19, 1929 |
| 1,714,690 | Nevins | May 28, 1929 |
| 1,724,426 | Schweinert | Aug. 13, 1929 |
| 1,786,285 | Bissell | Dec. 23, 1930 |
| 1,823,454 | Jardine | Sept. 15, 1930 |
| 2,029,508 | Scrimgeour | Feb. 4, 1936 |
| 2,093,771 | Colwell | Sept. 21, 1937 |
| 2,093,776 | Colwell | Sept. 21, 1937 |
| 2,354,947 | Colwell | Aug. 1, 1944 |